United States Patent
Kobayashi et al.

(10) Patent No.: US 7,312,650 B2
(45) Date of Patent: Dec. 25, 2007

(54) STEP-DOWN VOLTAGE OUTPUT CIRCUIT

(75) Inventors: Taku Kobayashi, Kyoto (JP); Keiichi Fujii, Kusatsu (JP); Yasunobu Kakumoto, Kyoto (JP); Toshinobu Nagasawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/252,508

(22) Filed: Oct. 18, 2005

(65) Prior Publication Data

US 2006/0082409 A1 Apr. 20, 2006

(30) Foreign Application Priority Data

Oct. 19, 2004 (JP) ............................. 2004-304610

(51) Int. Cl.
*G05F 1/10* (2006.01)
(52) U.S. Cl. ........................................ 327/536; 363/60
(58) Field of Classification Search ................ 327/536, 327/537
See application file for complete search history.

(56) References Cited

U.S. PATENT DOCUMENTS

| | | | |
|---|---|---|---|
| 5,408,140 A | 4/1995 | Kawai et al. | |
| 6,107,863 A | 8/2000 | Iwata | |
| 6,970,035 B2 * | 11/2005 | Tanimoto ................... | 327/536 |
| 2001/0011919 A1 * | 8/2001 | Tanimoto ................... | 327/536 |
| 2002/0167827 A1 | 11/2002 | Umeda et al. | |
| 2004/0165407 A1 | 8/2004 | Umeda et al. | |
| 2005/0046464 A1 * | 3/2005 | Kobayashi et al. ......... | 327/530 |
| 2006/0072696 A1 | 4/2006 | Kobayashi et al. | |

FOREIGN PATENT DOCUMENTS

| | | |
|---|---|---|
| JP | 3-230559 | 10/1991 |
| JP | 5-29360 A | 2/1993 |
| JP | 6-150652 | 5/1994 |
| JP | 6-195971 | 7/1994 |
| JP | 7-078472 | 3/1995 |
| JP | 10-285911 | 10/1998 |
| JP | 2002-300769 | 10/2002 |

* cited by examiner

*Primary Examiner*—Kenneth B. Wells
*Assistant Examiner*—Ryan C. Jager
(74) *Attorney, Agent, or Firm*—RatnerPrestia (57) ABSTRACT

A step-down voltage output circuit preventing: latch-up phenomenon in a load circuit for a period between a power-supply activation and complete start of a charge pump circuit; and rapid change of a substrate potential when a step-down voltage output is changed from ON to OFF. The step-down voltage output circuit has a timer circuit that operates depending on control signals and a timer period; a first N-channel MOS transistor in which a source is connected to a step-down voltage output terminal, a drain is connected to ground, a gate is connected to a power-supply voltage input terminal through a resistance; and a second N-channel MOS transistor in which a source is connected to the step-down voltage output terminal, a drain is connected to the gate of the first N-channel MOS transistor, and a gate is connected to an output terminal of the timer circuit.

3 Claims, 9 Drawing Sheets

PRIOR ART

STEP-DOWN VOLTAGE OUTPUT CIRCUIT

BACKGROUND OF THE INVENTION

The present invention relates to a step-down voltage output circuit for use in a semiconductor integrated circuit.

Figure 7:
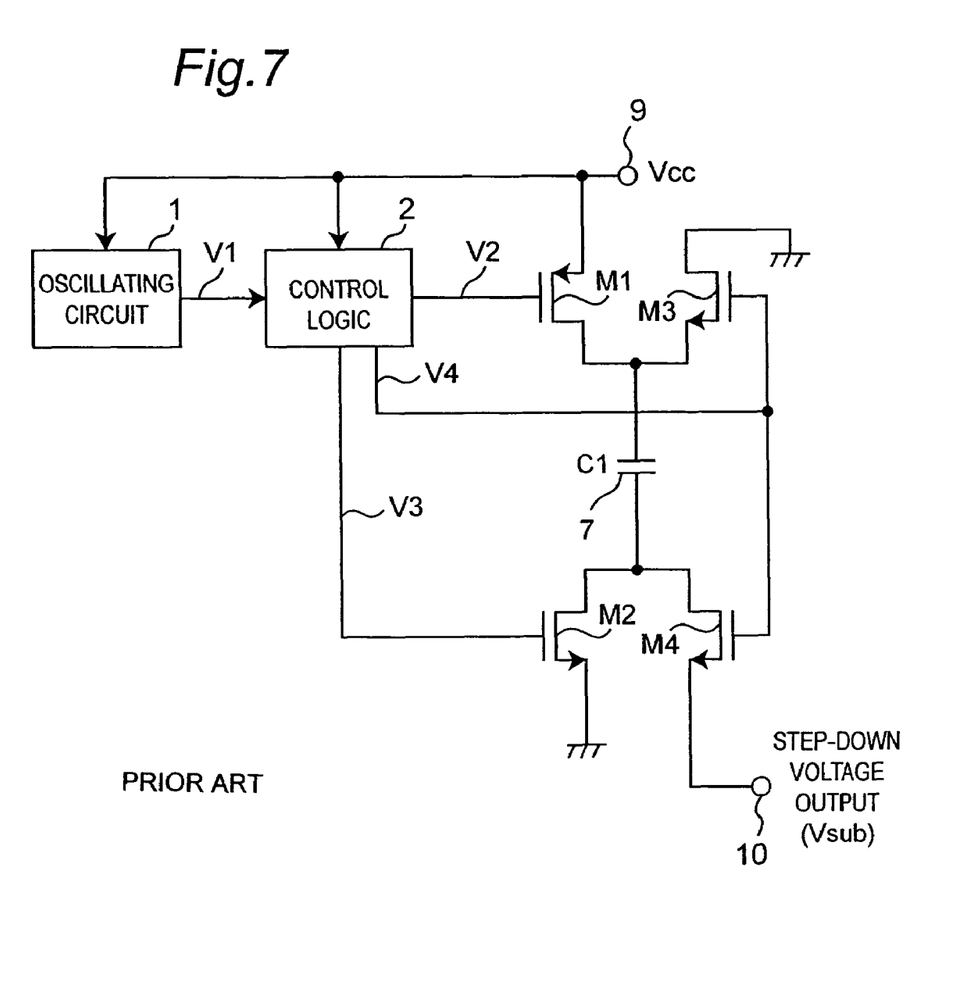
FIG. 7 is a block diagram showing the configuration of the step-down voltage output circuit using a charge pump circuit of a prior art.
Figure 8:
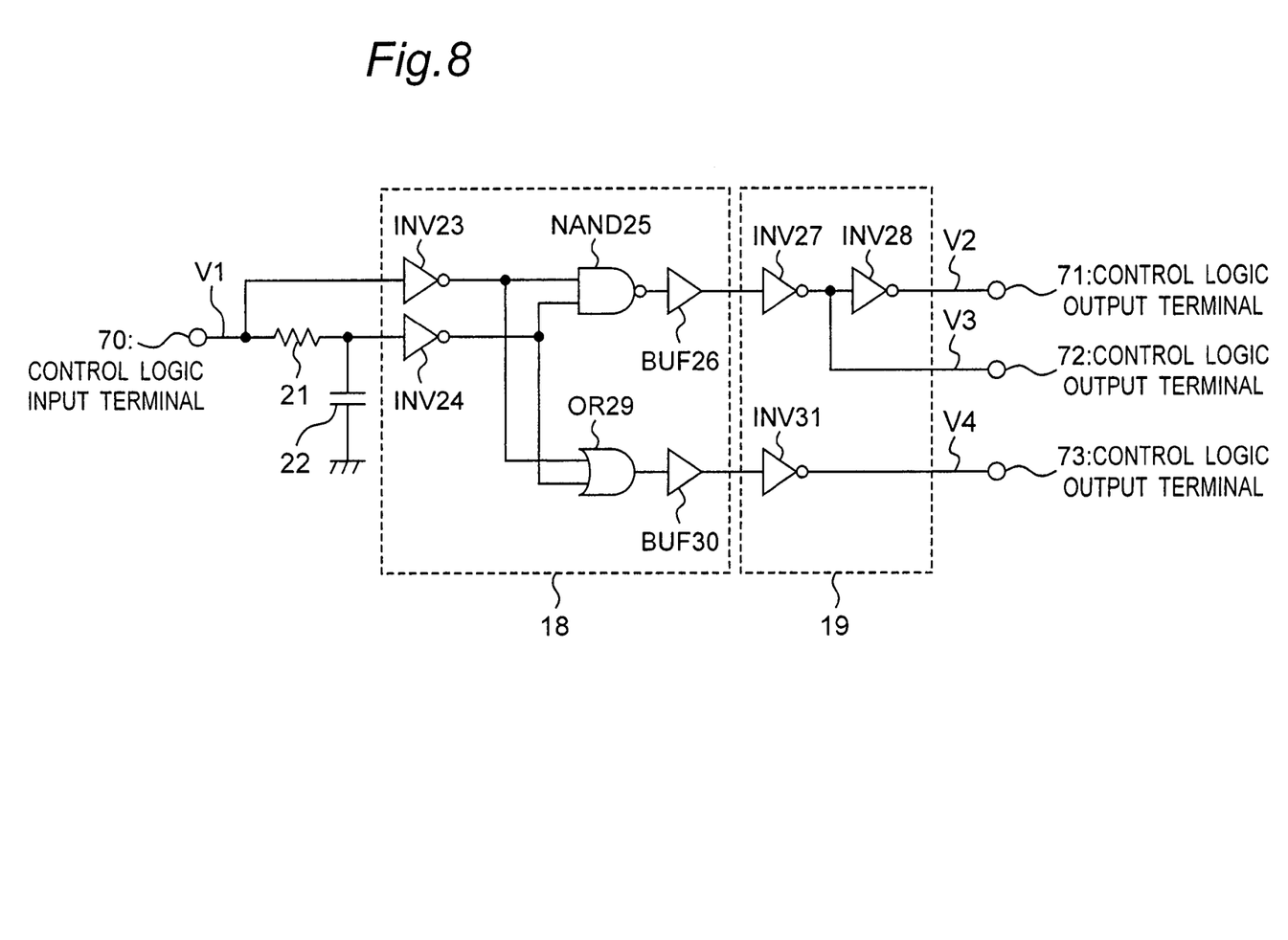
FIG. 8 is a circuit diagram showing one example of a specific configuration of control logics 2 in FIG. 1, FIG. 5, and FIG. 7.
Figure 9:
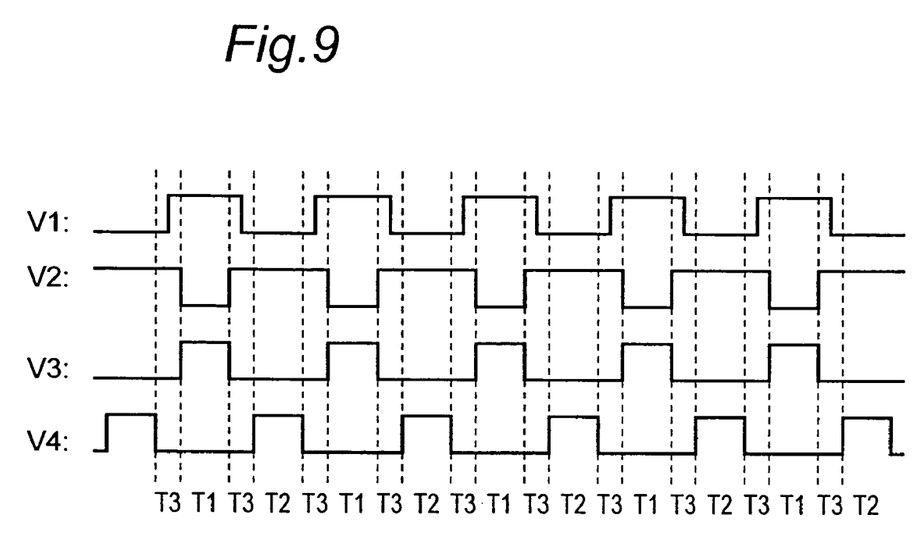
FIG. 9 is a timing diagram showing the operations of the step-down voltage output circuits in FIG. 1, FIG. 5, and FIG. 7.

Referring to FIG. 7, FIG. 8, and FIG. 9, a step-down voltage output circuit using a charge pump circuit of a prior art will be described. FIG. 7 is a block diagram showing a configuration of the step-down voltage output circuit using the charge pump circuit of the prior art.

In FIG. 7, the step-down voltage output circuit using the charge pump circuit of the prior art includes an oscillating circuit 1 that oscillates at a predetermined frequency and outputs a clock signal V1, a control logic 2 that receives the clock signal V1 as an input signal, a P-channel MOS transistor M1, an N-channel MOS transistor M2, an N-channel MOS transistor M3, an N-channel MOS transistor M4 (hereinafter referred to as "an M1", "an M2", "an M3", and "an M4" for simplicity, respectively), a capacitor 7 with a capacitance of C1, a power-supply voltage applying terminal 9 (hereinafter referred to as "a Vcc terminal 9") and a step-down voltage output terminal 10 (hereinafter referred to as "a Vsub terminal 10"). In addition, the power-supply voltage, which is applied to the Vcc terminal 9, is defined as Vcc, and the step-down voltage, which is output from the Vsub terminal 10, is defined as Vsub.

As to the oscillating circuit 1, an input terminal thereof is connected to the Vcc terminal 9, an output terminal thereof is connected to the control logic 2, respectively. As to the control logic 2, one input terminal thereof is connected to the Vcc terminal 9, the other input terminal thereof is connected to the output terminal of the oscillating circuit 1, one of the output terminals thereof is connected to a gate of the M1, another output terminal thereof is connected to a gate of the M2, and the other output terminal thereof is connected to a gate of the M3 and a gate of the M4, respectively. As to the M1, the gate thereof is connected to one of the output terminals of the control logic 2, a source thereof is connected to the Vcc terminal 9, and a drain thereof is connected to one electrode of the capacitor 7, respectively. As to the M2, the gate thereof is connected to another output terminal of the control logic 2, a source thereof is connected to the ground (hereinafter referred to as "GND"), and a drain thereof is connected to the other electrode of the capacitor 7, respectively. As to the M3, the gate thereof is connected to the other output terminal of the control logic 2, a source thereof is connected to one electrode of the capacitor 7, and a drain thereof is connected to GND, respectively. As to the M4, the gate thereof is connected to the other output terminal of the control logic 2, a source thereof is connected to the Vsub terminal 10, and a drain thereof is connected to the other electrode of the capacitor 7, respectively. As to the capacitor 7, one electrode thereof is connected to the drain of the M1 and the source of the M3, and the other electrode is connected to the drain of the M2 and the drain of the M4, respectively.

The control logic 2 is configured as shown in FIG. 8, for example. The control logic 2 receives the clock signal V1 from the oscillating circuit 1 through the control logic input terminal 70. The control logic 2 outputs the signals V2, V3 and V4 for controlling ON (an operating state, or a conductive state between the source and the drain of a transistor) and OFF (a NON-operating state, or a NON-conductive state between the source and the drain of a transistor) of the M1, the M2, and the M3 and the M4, respectively, to the control logic output terminals 71, 72 and 73.

FIG. 9 is a timing diagram showing the operations of the step-down voltage output circuit using a charge pump circuit of the prior art. In FIG. 9, a period in which the signal V2 is LOW, the signal V3 is HIGH, and the signal V4 is LOW is defined as period T1. A period in which the signal V2 is HIGH, the signal V3 is LOW, and the signal V4 is HIGH is defined as period T2. A period in which the signal V2 is HIGH, the signal V3 is LOW, and the signal V4 is LOW is defined as period T3. In the step-down voltage output circuit configured as shown in FIG. 7, the operation timings, each operation timing whereof is formed as one cycle of T3→T1→T3→T2→T3 constituted by the above-mentioned periods T1, T2, and T3, are repeated. Thereby, the step-down voltage output voltage Vsub is generated at the Vsub terminal 10. Each period T1, T2 and T3 will be described below with reference to FIGS. 7, 8 and 9.

First of all, the oscillating circuit 1 starts self-oscillation and outputs the clock signal V1 when the power-supply voltage Vcc is applied to the input terminal thereof. The control logic 2 receives the clock signal V1 as an input signal, and outputs signals V2, V3, and V4 for respectively controlling ON and OFF of the M1, the M2, and the M3 and the M4.

During the period T1, the M1 is turned ON (conductive), the M2 is turned ON (conductive), and the M3 and the M4 are turned OFF (NON-conductive) since the signal V2 is LOW, the signal V3 is HIGH, and the signal V4 is LOW.

In this state, one electrode of the capacitor 7 is connected to the Vcc terminal 9, and the other electrode thereof is connected to GND. The capacitor 7 is charged with a time constant determined by an ON resistance $R_{ONM1}$ of the M1 (a resistance between the drain and the source of the M1 when the M1 is ON) and the capacitance C1 of the capacitor 7. (Hereinafter the voltage charged in the capacitor 7 is referred to as "VC"). It is preferred that the control is executed so that the voltage VC is equal to the power-supply voltage Vcc. Therefore, the transistor size of the M1 needs to be decided so that the time constant is much shorter than the period T1.

During the period T2, the M1 is turned OFF (NON-conductive), the M2 is turned OFF (NON-conductive), and the M3 and the M4 are turned ON (conductive) since the signal V2 is HIGH, the signal V3 is LOW, and the signal V4 is HIGH.

In this state, one electrode of the capacitor 7 is connected to GND, and the other electrode thereof is connected to the Vsub terminal 10. Therefore, the voltage VC charged in the capacitor 7 during the period T1 is discharged, and then the discharging voltage −VC of the capacitor 7, which is equal to a negative power-supply voltage −Vcc, is output to the Vsub terminal 10.

During the period T3, the M1, the M2, the M3 and the M4 are all turned OFF (NON-conductive) since the signal V2 is HIGH, the signal V3 is LOW, and the signal V4 is LOW.

Due to the effect of parasitic capacitance consisted between the gate electrodes of the M1 and the M3 and substrate, the switching from LOW to HIGH in the signal V2 and the switching from HIGH to LOW in the signal V4 are possibly delayed. If the period T1, in which the signal V2 is LOW, and the period T2, in which the signal V4 is HIGH, are made to come close each other, both of the M1 and the M3 might be ON simultaneously, and as a result, a pass-through current might flow between Vcc potential and GND potential.

In the step-down voltage output circuit using the charge pump circuit of the prior art, by interposing the period T3 for temporarily turning OFF all of the transistors between the period T1 and the period T2, incidence of the above-mentioned pass-through current is prevented.

In addition, the length of the period T3 is determined depending on delay time of the clock signal V1 that is determined by a resistance 21 and a capacitor 22 in the control logic 2 shown in FIG. 8.

In the case that a semiconductor integrated circuit incorporates therein such a step-down voltage output circuit and supplies a substrate potential from the Vsub terminal 10, the load circuit connected to the Vsub terminal 10 can receive the negative power-supply voltage −Vcc as well as the positive power-supply voltage Vcc. For example, in the case that an audio circuit is connected to the Vsub terminal 10 as a load, an output dynamic range of the audio circuit that receives the positive and negative power-supply voltages Vcc and −Vcc becomes larger twice as much as that of the circuit that receives the positive power-supply voltage Vcc and the ground potential GND.

However, in the step-down voltage output circuit using the charge pump circuit of the prior art described above, in the case that the Vsub terminal 10 is connected to a substrate potential of another circuit, there causes a certain time of delay in outputting of the clock signal V1 at a predetermined amplitude from the oscillating circuit 1 after activation of the power-supply voltage Vcc. During the period between the time of activation of the power supply Vcc and the time when the oscillating circuit 1 outputs the clock signal V1 at the predetermined amplitude and the charge pump circuit is completely operated in compliance with the clock signal V1, the step-down voltage generated at the Vsub terminal 10 is kept to a low voltage close to GND potential. In addition, during this period the Vsub terminal 10 is connected to the drain of the M4. Therefore, the output impedance at the Vsub terminal 10 becomes high and the substrate potential connected to the Vsub terminal 10 might get unstable. As a result, a virtual thyristor formed of parasitic elements on the load circuit connected to the Vsub terminal 10 might be activated. The step-down voltage output circuit using the charge pump circuit of the prior art has a problem that activation of the virtual thyristor tends to cause breakdown of the circuit, that is, so-called latch-up phenomenon.

Furthermore, in the step-down voltage output circuit using the charge pump circuit of the prior art, when the step-down voltage output at the Vsub terminal 10 is changed from ON state to OFF state (from −Vcc potential to GND potential), the substrate potential changes rapidly. Therefore, the step-down voltage output circuit using the charge pump circuit of the prior art has a problem that the load circuit connected to the Vsub terminal 10 might be damaged due to rapid change of the substrate potential.

BRIEF SUMMARY OF THE INVENTION

The step-down voltage output circuit of the present invention is made to solve the above-mentioned problems in the prior art. An object of this step-down voltage output circuit is: to prevent latch-up phenomenon in a load circuit for a period between activation of a power supply and complete start of operation of a charge pump circuit; and to prevent rapid change of a substrate potential when the step-down voltage output is changed from ON state to OFF state.

To solve the above-mentioned problems, the present invention has configurations described below.

According to an aspect of the present invention, a step-down voltage output circuit having a charge pump circuit with an oscillating circuit stepping down a power-supply voltage and outputting a step-down voltage includes: a timer circuit in which a timer period is set depending on a frequency of the above-mentioned oscillating circuit, the above-mentioned timer circuit outputting LOW from a time when a first control signal is input thereto to a time when the above-mentioned timer period expires and outputting HIGH after the above-mentioned timer period expires during a period in which the above-mentioned first control signal is input from a control signal input terminal, and outputting LOW during a period in which a second control signal is input from the above-mentioned control signal input terminal; a first N-channel MOS transistor in which a source is connected to a step-down voltage output terminal, a drain is connected to a ground potential, and a gate is connected to a power-supply voltage input terminal through a resistance; and a second N-channel MOS transistor in which a source is connected to the above-mentioned step-down voltage output terminal, a drain is connected to the gate of the above-mentioned first N-channel MOS transistor, and a gate is connected to an output terminal of the above-mentioned timer circuit.

The first control signal and the second control signal are, for example, HIGH and LOW binary control signals.

The frequency of the above-mentioned oscillating circuit can be set arbitrarily by components of the oscillating circuit. Furthermore, the timer period can be set arbitrarily depending on the time from activation of a power supply to complete start of operation of a charge pump circuit by the frequency of the oscillating circuit and/or the components of the timer circuit etc.

In accordance with this invention, the output terminal of the charge-pump circuit is short-circuited to the ground potential during the period between activation of a power supply and complete start of operation of a charge pump circuit. Thereby, latch-up phenomenon in a load circuit can be prevented. Furthermore, by discharging a voltage at the output terminal of the charge-pump circuit by an internal resistance in the load circuit connected to the output terminal when the step-down voltage output is changed from ON state to OFF state, rapid change of the substrate potential is prevented.

According to another aspect of the present invention, the above-mentioned step-down voltage output circuit further has a control voltage adjusting part that adjusts an output of the above-mentioned timer circuit and outputs a predetermined voltage that is lower than a threshold voltage of the above-mentioned second N-channel MOS transistor and is close to the above-mentioned threshold voltage during a period wherein the output of the above-mentioned timer circuit is LOW.

In the above-mentioned step-down voltage output circuit, during the period in which the output of the timer circuit is LOW, the control voltage adjusting part adjusts the output of the timer circuit to above-mentioned predetermined voltage. Thereby, the low-polarity control voltage that is to be applied to the gate of the second N-channel MOS transistor is adjusted. The predetermined voltage can be adjusted arbitrarily by the components in the control voltage adjusting part. In accordance with this invention, by setting a low-polarity control voltage that is to be applied to the gate of the second N-channel MOS transistor to a value that is lower than the threshold voltage of the second N-channel MOS transistor and is close to the threshold voltage, the amount of the change of the substrate potential when the step-down voltage output is changed from ON state to OFF state can be further reduced. The present invention is effective in particular for measures for transient sound in the case that the step-down voltage output circuit of the present invention is applied to an audio use.

The present invention has the effect of realizing the step-down voltage output circuit that can prevent latch-up phenomenon for the period between activation of the power supply and complete start of operation of the charge pump circuit, and can prevent rapid change of the substrate potential when the step-down voltage output is changed from ON state to OFF state.

According to the other aspect of the present invention, a step-down voltage output circuit has a timer circuit that operates depending on a control signal which is input thereto and on a predetermined timer period; a first N-channel MOS transistor in which a source is connected to a step-down voltage output terminal, a drain is connected to a ground potential, and a gate is connected to a power-supply voltage input terminal through a resistance; and a second N-channel MOS transistor in which a source is connected to the above-mentioned step-down voltage output terminal, a drain is connected to the gate of the above-mentioned first N-channel MOS transistor, and a gate is connected to an output terminal of the above-mentioned timer circuit.

While the novel features of the invention are set forth particularly in the appended claims, the invention, both as to organization and content, will be better understood and appreciated, along with other objects and features thereof, from the following detailed description taken in conjunction with the drawings.

It will be recognized that some or all of the figures are schematic representations for purposes of illustration and do not necessarily depict the actual relative sizes or locations of the elements shown.

DETAILED DESCRIPTION OF THE INVENTION

Embodiments that specifically describe best modes for conducting the present invention will be described with reference to figures below.

EMBODIMENT 1

Figure 1:
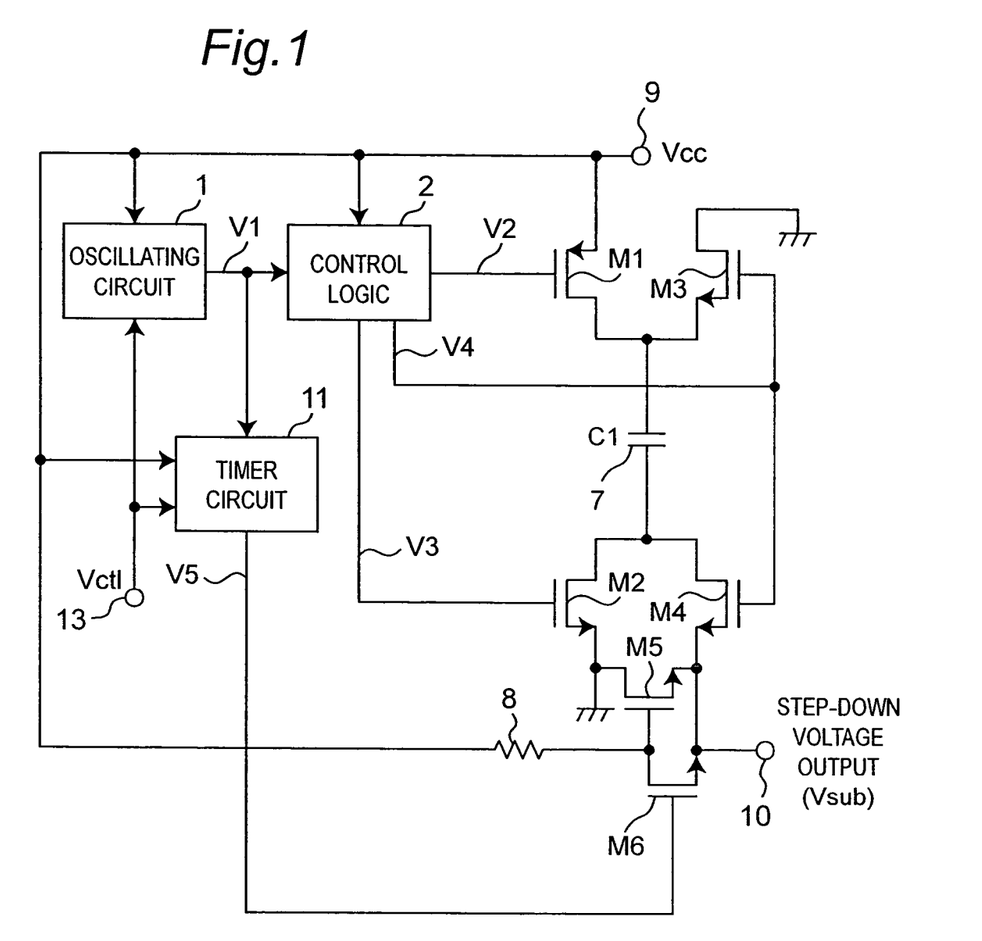
FIG. 1 is a block diagram showing a configuration of a step-down voltage output circuit using a charge pump circuit in accordance with Embodiment 1 of the present invention.

Referring to FIG. 1, FIG. 2, FIG. 3, FIG. 4, FIG. 8, and FIG. 9, a step-down voltage output circuit using a charge pump circuit in accordance with Embodiment 1 of the present invention will be described. FIG. 1 is a block diagram showing a configuration of the step-down voltage output circuit using the charge pump circuit in accordance with Embodiment 1 of the present invention.

The step-down voltage output circuit using the charge pump circuit in accordance with Embodiment 1 of the present invention is formed on a semiconductor device.

In FIG. 1, the step-down voltage output circuit using the charge pump circuit in accordance with Embodiment 1 of the present invention includes an oscillating circuit 1, a control logic 2, a P channel MOS transistor M1, an N-channel MOS transistor M2, an N-channel MOS transistor M3, an N-channel MOS transistor M4, an N-channel MOS transistor M5, an N-channel MOS transistor M6 (hereinafter referred to as "an M1", "an M2", "an M3", "an M4", "an M5", and "an M6" for simplicity, respectively), a capacitor 7 with a capacitance of C1, a first resistance 8, a power-supply voltage application terminal 9 (hereinafter referred to as "a Vcc terminal 9"), a step-down voltage output terminal 10 (hereinafter referred to as "a Vsub terminal 10"), a timer circuit 11, and a control signal input terminal 13 (hereinafter referred to as "a Vctl terminal 13") for receiving the control signals that control the start and stop of the operations for the oscillating circuit 1 and the control logic 2.

In addition, the power-supply voltage applied to the Vcc terminal 9 is defined as "Vcc", and the step-down output voltage that is output from Vsub terminal 10 is defined as "Vsub".

As to the oscillating circuit 1, one input terminal thereof is connected to the Vcc terminal 9, the other input terminal thereof is connected to the Vctl terminal 13, and an output terminal thereof is connected to the control logic 2 and the timer circuit 11, respectively. As to the control logic 2, one input terminal thereof is connected to the Vcc terminal 9, the other input terminal thereof is connected to the output terminal of the oscillating circuit 1, one of the output terminals thereof is connected to a gate of the M1, another output terminal thereof is connected to a gate of the M2, and the other output terminal thereof is connected to a gate of the M3 and a gate of the M4, respectively. As to the timer circuit 11, one of the input terminals thereof is connected to the Vcc terminal 9, another input terminal thereof is connected to the Vctl terminal 13, the other input terminal thereof is connected to the output terminal of the oscillating circuit 1, an output terminal thereof is connected to a gate of the M6, respectively.

As to the M1, the gate thereof is connected to one of the output terminals of the control logic 2, a source thereof is connected to the Vcc terminal 9, and a drain thereof is connected to one electrode of the capacitor 7, respectively.

As to the M2, the gate thereof is connected to another output terminal of the control logic 2, a source thereof is connected to ground (hereinafter referred to as "GND"), and a drain thereof is connected to the other electrode of the capacitor 7, respectively. As to the M3, the gate thereof is connected to the other output terminal of the control logic 2, a source thereof is connected to one electrode of the capacitor 7, and a drain thereof is connected to the GND, respectively. As to the M4, the gate thereof is connected to the other output terminal of the control logic 2, a source thereof is connected to the Vsub terminal 10, and a drain thereof is connected to the other electrode of the capacitor 7, respectively.

As to the M5, a gate thereof is connected to a drain of the M6, a source (one N-type diffusion layer) thereof is connected to the Vsub terminal 10, and a drain (the other N-type diffusion layer) thereof is connected to GND, respectively. As to the M6, the gate thereof is connected to the output terminal of the timer circuit 11, a source (one N-type diffusion layer) thereof is connected to the Vsub terminal 10, and the drain (the other N-type diffusion layer) thereof is connected to the gate of the M5, respectively. As to the first resistance 8, one electrode is connected to the Vcc terminal 9, and the other electrode is connected to the connection point between the gate of the M5 and the drain of the M6, respectively. As to the capacitor 7, one electrode is connected to the drain of the Ml and the source of the M3, the other electrode is connected to the drain of the M2 and the drain of the M4, respectively.

The oscillating circuit 1 oscillates at a predetermined frequency and outputs a clock signal V1. The clock signal V1 is output from the oscillating circuit 1 during the period in which the power-supply voltage Vcc is applied to the Vcc terminal 9 and HIGH (e.g. Vcc potential) is input from the Vctl terminal 13. The clock signal V1 is not output from the oscillating circuit 1 (i.e. the oscillating circuit 1 always outputs LOW) during the period in which the power-supply voltage Vcc is not applied to the Vcc terminal 9 or LOW (e.g. GND potential) is input from the Vctl terminal 13.

The control logic 2 is configured as shown in FIG. 8, for example. The control logic 2 receives the clock signal V1 from the oscillating circuit 1 through the control logic input terminal 70. The control logic 2 outputs the signals V2, V3 and V4 for controlling ON (an operating state, or a conductive state between the source and the drain of a transistor) and OFF (a NON-operating state, or a NON-conductive state between the source and the drain of a transistor) of the M1, the M2, and the M3 and the M4, respectively, to the control logic output terminals 71, 72 and 73. In FIG. 8, a block 18 including inverter circuits INV23 and INV24, a NAND circuit NAND25, buffer circuits BUF26 and BUF30, and an OR circuit OR29 is controlled using Vcc potential as a HIGH level and GND potential as a LOW level, and a block 19 including inverter circuits INV27, INV28 and INV31 is controlled using Vcc potential as a HIGH level and –Vcc potential as a LOW level.

Figure 2:
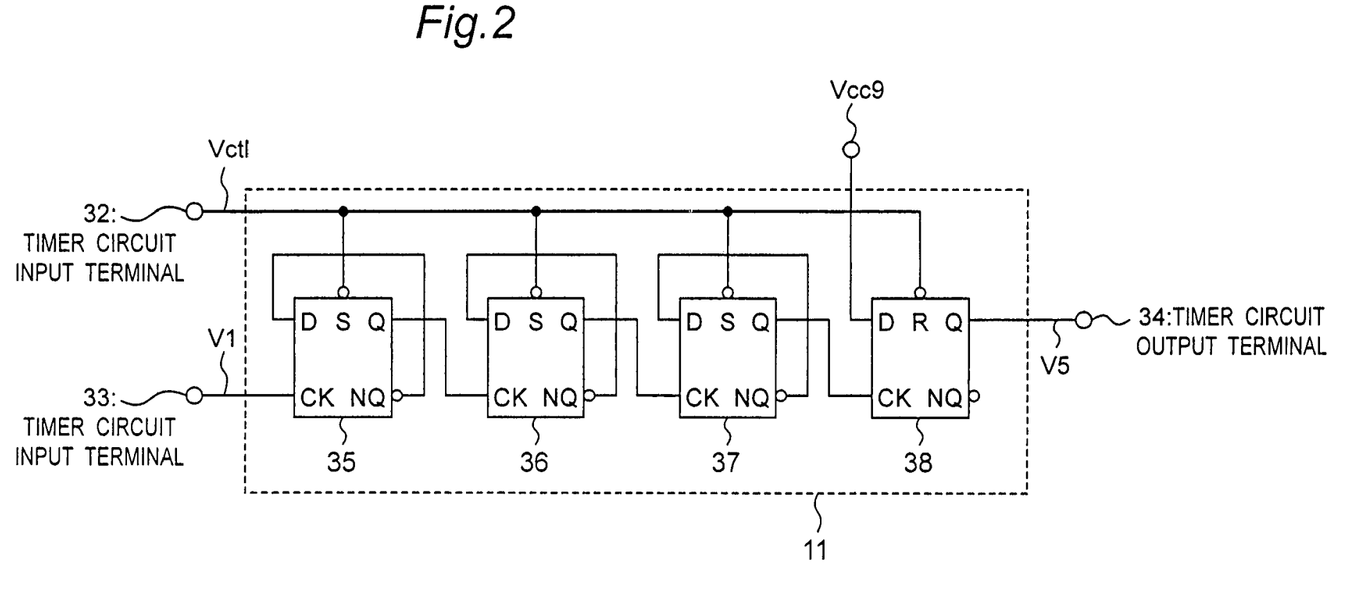
FIG. 2 is a circuit diagram showing one example of a specific configuration of a timer circuit 11 in accordance with Embodiment 1 of the present invention.

As shown in FIG. 2, the timer circuit 11 is constituted by multistage (e.g. four-stage) D-type flip-flop circuits 35, 36, 37, and 38, for example. The timer circuit 11 inputs the clock signal V1 from the oscillating circuit 1 through a timer circuit input terminal 33 as a reference clock, inputs the control signal Vctl from the Vctl terminal 13 through a timer circuit input terminal 32, and outputs the control signal Vctl as a control signal V5 to a timer circuit output terminal 34 after the predetermined timer period (hereinafter this operation to count the predetermined timer period is referred to as "a timer operation"). The predetermined timer period can be set arbitrarily depending on the period between a raising edge of the control signal Vctl and complete start of operation of a charge pump circuit. The setting of the predetermined timer period can be varied easily just by varying the frequency of the oscillating circuit 1, or the number of connections of D-type flip-flop circuits in the timer circuit 11, in other words, the number with which the clock signal V1 is divided. The timer circuit 11 executes the timer operation during the period in which the power-supply voltage Vcc is applied from the Vcc terminal 9 and HIGH (Vcc potential) is input from the Vctl terminal 13, and does not executes the timer operation (i.e. the timer circuit 11 always outputs LOW) during the period in which the power-supply voltage Vcc is NOT applied from the Vcc terminal 9 or LOW (GND potential) is input from the Vctl terminal 13.

FIG. 9 is a timing diagram showing the operations of the step-down voltage output circuit using a charge pump circuit in accordance with Embodiment 1 of the present invention. In FIG. 9, a period in which the signal V2 is LOW, the signal V3 is HIGH, and the signal V4 is LOW is defined as period T1. A period in which the signal V2 is HIGH, the signal V3 is LOW, and the signal V4 is HIGH is defined as period T2. A period in which the signal V2 is HIGH, the signal V3 is LOW, and the signal V4 is LOW is defined as period T3. In the step-down voltage output circuit configured as shown in FIG. 1, the operation timings, each operation timing whereof is formed as one cycle of T3→T1→T3→T2→T3 constituted by the above-mentioned periods T1, T2, and T3, are repeated. Thereby, the step-down voltage output Vsub is generated at the Vsub terminal 10. Each period T1, T2 and T3 will be described below with reference to FIG. 1, FIG. 8, and FIG. 9.

First of all, when HIGH is input from the Vctl terminal 13 in the state that the power-supply voltage Vcc is applied to the input terminal of the oscillating circuit 1, the oscillating circuit 1 starts self-oscillation and outputs the clock signal V1. The control logic 2 receives the clock signal V1 as an input signal, and outputs signals V2, V3, and V4 for controlling ON and OFF of the M1, the M2, and the M3 and the M4, respectively.

During the period T1, the M1 is turned ON (conductive), the M2 is turned ON (conductive), and the M3 and the M4 are turned OFF (NON-conductive) since the signal V2 is LOW, the signal V3 is HIGH, and the signal V4 is LOW.

In this state, one electrode of the capacitor 7 is connected to the Vcc terminal 9, and the other electrode thereof is connected to GND. The capacitor 7 is charged with a time constant determined by the ON resistance $R_{ONM1}$ of the M1 (a resistance between the drain and the source of the M1 when the M1 is ON) and capacitance C1 of the capacitor 7 (hereinafter the voltage charged in the capacitor 7 is referred to as "VC"). It is preferred that the control is executed so that the voltage VC is equal to the power-supply voltage Vcc. Therefore, the transistor size of the M1 needs to be decided so that the time constant is much shorter than the period T1.

During the period T2, the M1 is turned OFF (NON-conductive), the M2 is turned OFF (NON-conductive), and the M3 and the M4 are turned ON (conductive) since the V2 is HIGH, the V3 is LOW, and the V4 is HIGH.

In this state, one electrode of the capacitor 7 is connected to GND, and the other electrode thereof is connected to the Vsub terminal 10. Therefore, the voltage VC charged in the capacitor 7 during the period T1 is discharged, and then the discharging voltage –VC of the capacitor 7, which is equal to the negative power-supply voltage –Vcc, is output to the Vsub terminal 10.

During the period T3, the M1, the M2, the M3 and the M4 are all turned OFF (NON-conductive) since the signal V2 is HIGH, the signal V3 is LOW, and the signal V4 is LOW. In the step-down voltage output circuit using the charge pump circuit in accordance with Embodiment 1 of the present invention, by interposing the period T3 for temporarily turning OFF all of the transistors between the period T1 and the period T2, incidence of the pass-through current between Vcc potential and GND potential resulting from that both of the M1 and the M3 are ON simultaneously is prevented as well as in the prior art.

In addition, the length of the period T3 is determined depending on the delay time of the clock signal V1 determined by the resistance 21 and the capacitor 22 in the control logic 2 shown in FIG. 8.

Next, referring to the FIG. 3 and FIG. 4, an operation regarding the M5 and the M6 and the timer circuit 11, which is one of the features of the step-down voltage output circuit using a charge pump circuit in accordance with Embodiment 1 of the present invention, will be described.

Figure 3:
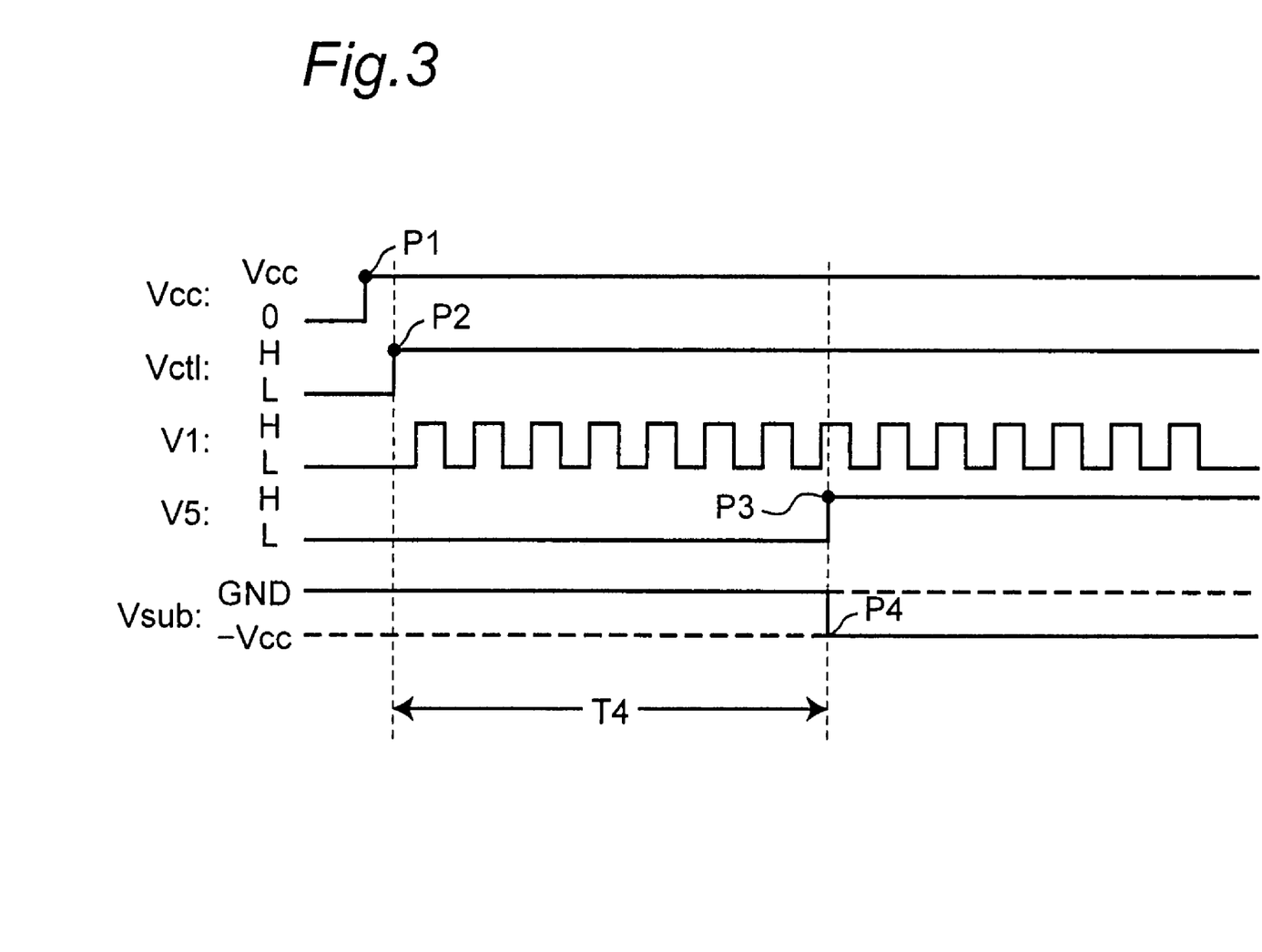
FIG. 3 is a timing diagram showing operations of the step-down voltage output circuits using a charge pump circuit in accordance with Embodiment 1 and 2 of the present invention at around activation of the power supply (when the step-down voltage output is changed from OFF to ON)

FIG. 3 is a timing diagram showing operations of the step-down voltage output circuit using a charge pump circuit in accordance with Embodiment 1 of the present invention at around activation of the power-supply voltage Vcc (when the step-down voltage output Vsub is changed from OFF state to ON state (from GND potential to −Vcc potential)). In FIG. 3, at an initial condition, the power-supply voltage Vcc is zero, the control signal Vctl, the clock signal V1, and the signal V5 are LOW, and the step-down voltage output Vsub is in GND potential.

First of all, the power-supply voltage Vcc is applied to the Vcc terminal 9 (at the point of time P1). At this point of time, the oscillating circuit 1 and the timer circuit 11 have stopped each operation since the control signal Vctl is LOW (GND potential).

Next, in the state that the power-supply voltage Vcc is applied to the Vcc terminal 9, the control signal Vctl is changed from LOW (GND potential) to HIGH (Vcc potential) (at the point of time P2). The oscillating circuit 1 starts self-oscillation at the predetermined frequency. The timer circuit 11 starts the timer operation. During the period between the time when the control signal Vctl becomes HIGH and the time when the timer period T4 expires, the signal V5 is kept to LOW (GND potential) by the timer circuit 11. Since GND potential, which is the low polarity of the signal V5, is applied to the gate of the M6 and GND potential at the Vsub terminal 10 is applied to the source thereof, the M6 is OFF. The M5 is ON since Vcc potential is applied to the gate of the M5 through the first resistance 8 and GND potential at the Vsub terminal 10 is applied to the source thereof. The Vsub terminal 10 is short-circuited to GND with low impedance through the source and the drain of the M5, and then GND potential is output from the Vsub terminal 10. During passage of the predetermined timer period T4, the oscillating circuit 1 comes to oscillate at the predetermined amplitude, and then the charge pump circuit gets into the state that it can operate with stability.

After the predetermined timer period T4, the timer circuit 11 outputs a HIGH (Vcc potential) signal V5 (at the point of time P3). Therefore, the M6 turns ON since Vcc potential, which is the high polarity of the signal V5, is applied to the gate of the M6 and GND potential at the Vsub terminal 10 is applied to the source thereof. The M5 turns OFF since GND potential at the Vsub terminal 10 is applied to the gate of the M5 through the source and the drain of the M6 and GND potential at the Vsub terminal 10 is applied to the source thereof. The voltage −Vcc charged in the capacitor 7 is output from the Vsub terminal 13 (at the point of time P4).

As described above, the step-down voltage output circuits using a charge pump circuit in accordance with Embodiment 1 of the present invention keeps the output impedance at the Vsub terminal 10 to low impedance during the period between the time when activation of the power supply and the time when the timer period T4 expires. Thereby, in the case that a semiconductor device incorporates therein such a step-down voltage output circuit and supplies the substrate potential from the Vsub terminal 10, the latch-up phenomenon in the load circuit connected to the Vsub terminal 10 at activation of the power supply can be prevented.

Figure 4:
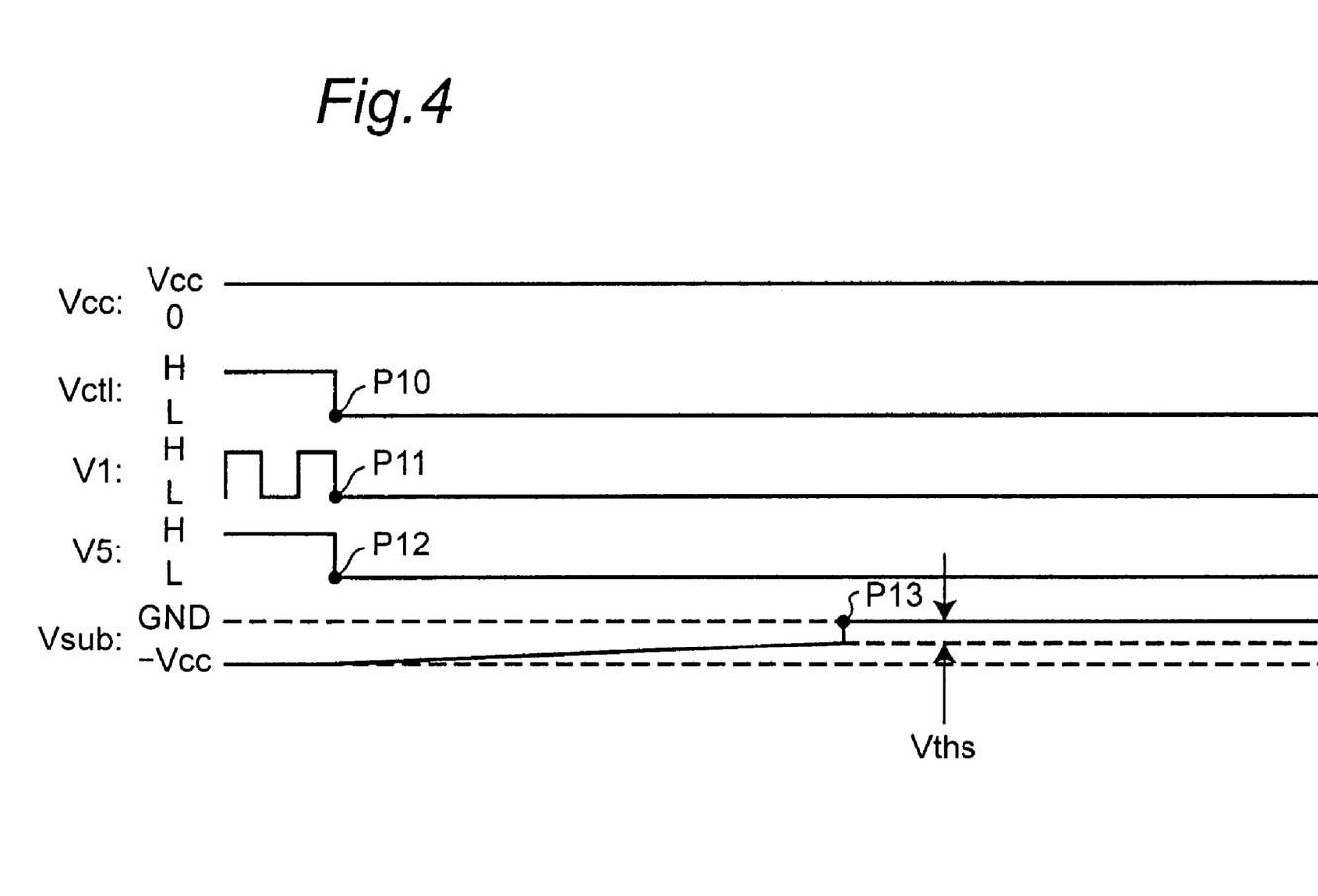
FIG. 4 is a timing diagram showing the operations of the step-down voltage output circuit using a charge pump circuit in accordance with Embodiment 1 of the present invention when the step-down voltage output is changed from ON to OFF.

FIG. 4 is a timing diagram showing the operations of the step-down voltage output circuits using a charge pump circuit in accordance with Embodiment 1 of the present invention when the step-down voltage output Vsub is changed from ON state to OFF state (from −Vcc potential to GND potential).

First of all, the control signal Vctl is changed from HIGH (Vcc potential) to LOW (GND potential) (at the point of time P10). Simultaneously, the oscillating circuit 1 and the timer circuit 11 stop each operation, and as a result, the clock signal V1 and the signal V5 become LOW (GND potential) (at the point of time P11 and P12).

At this point of time, in the state that −Vcc potential at the Vsub terminal 10 is applied to the source of the M6, the voltage at the gate of the M6 becomes GND potential, which is the low polarity of the signal V5. However, since the potential difference between the gate and the source of the M6 is larger than a threshold voltage Vths of the M6 (that is, (GND−Vcc)>Vths), the M6 is still kept in ON state. Therefore, the M5 is still kept in OFF state.

The operation timings for outputting −Vcc to the Vsub terminal 10 by the oscillating circuit 1 and the timer circuit 11, each operation timing whereof is formed as one cycle of T3→T1→T3→T2→T3, have stopped. Therefore, the voltage charged in the capacitor 7 is discharged by the internal resistance in the load circuit connected to the Vsub terminal 10, and as a result, the step-down voltage output Vsub starts to increase gradually from −Vcc level to GND level.

When the voltage difference between the voltage at the source of the M6 and GND potential applied to the gate thereof comes equal to or smaller than the threshold voltage Vths of the M6 eventually (i.e. (GND−Vsub)≦Vths), the M6 turns OFF and the M5 turns ON. Thereby, the Vsub terminal 10 is short-circuited to GND with low impedance again, and then GND potential is output from the Vsub terminal 10 (at the point of time P13).

As described above, in the step-down voltage output circuits using a charge pump circuit in accordance with Embodiment 1 of the present invention, the step-down voltage output Vsub increases gradually from −Vcc potential to GND potential resulting from the discharge by the internal resistance in the load circuit connected to the Vsub terminal 10 when the step-down voltage output Vsub is changed from OFF state to ON state (from −Vcc potential to GND potential). Thereby, in the case that a semiconductor device incorporates therein such a step-down voltage output circuit and supplies the substrate potential from the Vsub terminal 10, rapid change of the voltage to be supplied to the load circuit connected to the Vsub terminal 10 can be prevented.

According to the step-down voltage output circuit using a charge pump circuit in accordance with Embodiment 1 of the present invention, by shorting the Vsub terminal to GND for the period between activation of the power supply and complete start of operation of the charge pump circuit, latch-up phenomenon in a load circuit can be prevented.

Moreover, rapid change of the substrate potential can be also prevented by utilizing the discharge of the step-down voltage output Vsub through the load circuit when the step-down voltage output is changed from ON state to OFF state.

EMBODIMENT 2

Figure 5:
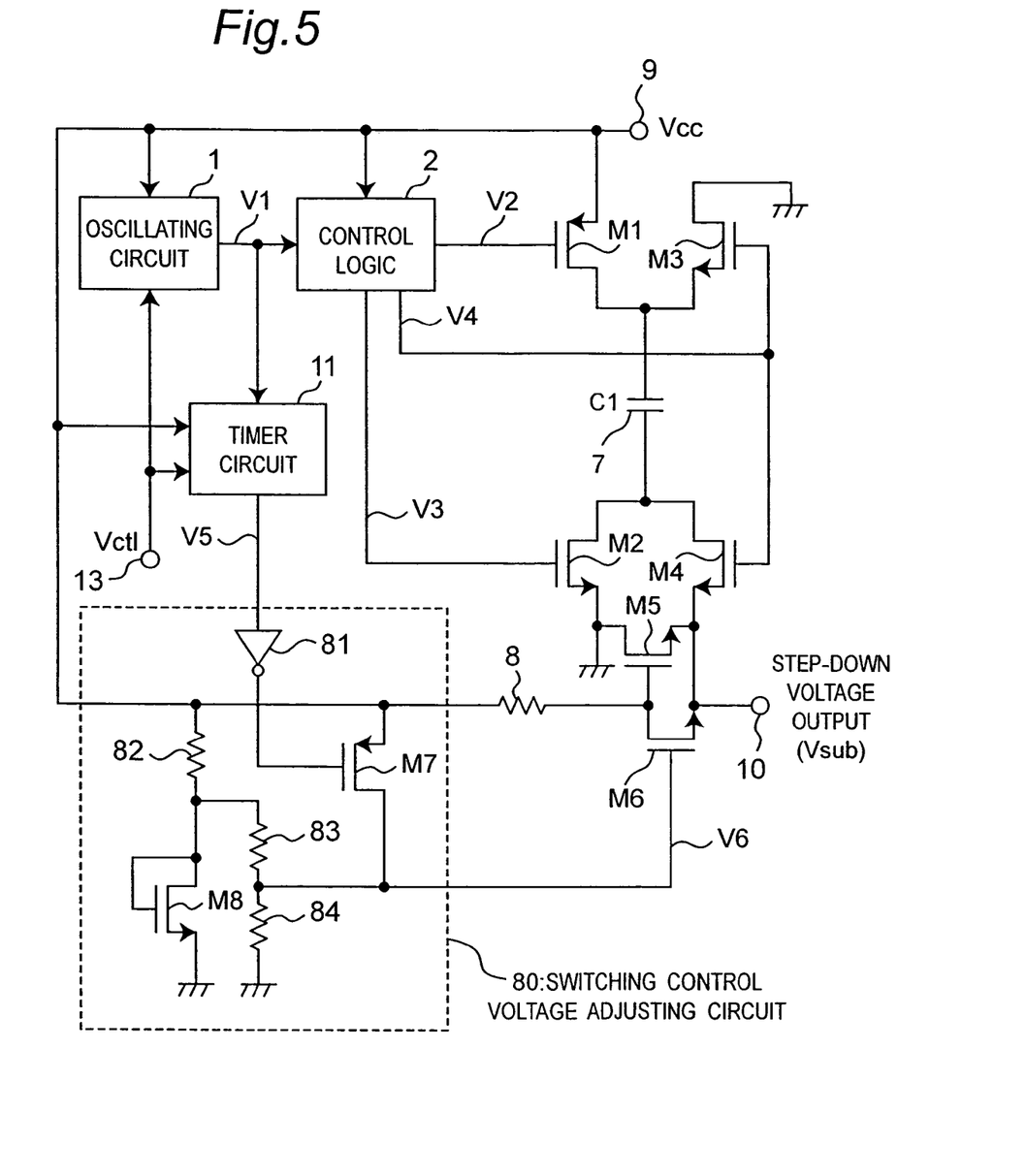
FIG. 5 is a block diagram showing a configuration of the step-down voltage output circuit using a charge pump circuit in accordance with Embodiment 2 of the present invention.
Figure 6:
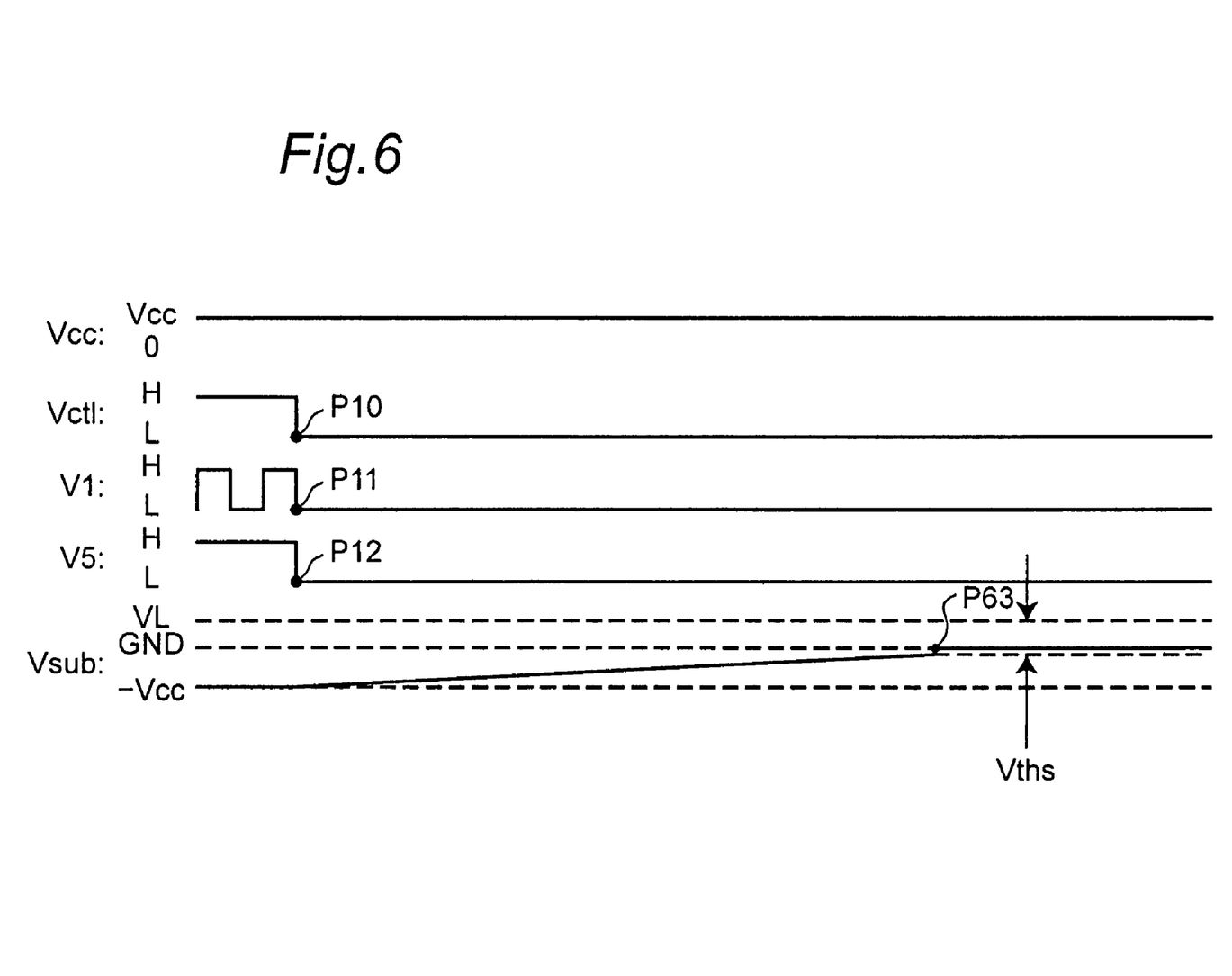
FIG. 6 is a timing diagram showing the operations of the step-down voltage output circuit using a charge pump circuit in accordance with Embodiment 2 of the present invention when the step-down voltage output is changed from ON to OFF.

Referring to FIG. 3, FIG. 5, and FIG. 6, a step-down voltage output circuit using a charge pump circuit in accordance with Embodiment 2 of the present invention will be described. FIG. 5 is a block diagram showing a configuration of the step-down voltage output circuit using the charge pump circuit in accordance with Embodiment 2 of the present invention.

The step-down voltage output circuit using a charge pump circuit in accordance with Embodiment 2 shown in FIG. 5 is different from that in accordance with Embodiment 1 shown in FIG. 1 in that a switching control voltage adjusting circuit (a control voltage adjusting part) 80 is added. In other respects, Embodiment 2 is similar to Embodiment 1; components having similar or equivalent configurations are designated by the same numerals, and their detailed descriptions are omitted.

The switching control voltage adjusting circuit 80 is provided between the gate of the M6 and the output terminal of the timer circuit 11, and is connected to the connection point between the Vcc terminal 9 and the first resistance 8. The switching control voltage adjusting circuit 80 receives the signal V5 from the timer circuit 11. The switching control voltage adjusting circuit 80 adjusts the low-polarity voltage of the signal V5 before outputting a signal V6 for controlling ON (an operating state, or a conductive state between the source and the drain of a transistor) and OFF (a NON-operating state, or a NON-conductive state between the source and the drain of a transistor) of the M6.

The switching control voltage adjusting circuit 80, for example, includes an inverter circuit 81, a P-channel MOS transistor M7, an N-channel MOS transistor M8 (hereinafter referred to as "an M7", "an M8" for simplicity, respectively), a second resistance 82, a third resistance 83, and a fourth resistance 84.

The M7 turns OFF (NON-conductive) when the voltage applied to a gate thereof is HIGH (e.g. Vcc potential), and turns ON (conductive) when the voltage applied to the gate thereof is LOW (e.g. GND potential).

The second resistance 82, the third resistance 83, and the fourth resistance 84 are series connected in sequence between the connection point between the Vcc terminal 9 and the first resistance 8 and GND potential. The connection point between the third resistance 83 and the fourth resistance 84 is connected to the gate of the M6. As to the inverter circuit 81, an input terminal thereof is connected to the output terminal of the timer circuit 11. As to the M7, a source thereof is connected to the connection point between the Vcc terminal 9 and the first resistance 8, a drain thereof is connected to the gate of the M6, and the gate thereof is connected to the output terminal of the inverter circuit 81, respectively. As to the M8, a source thereof is connected to GND potential, a drain and a gate thereof are connected to the connection point between the second resistance 82 and the third resistance 83, respectively.

When the signal V5 is HIGH (Vcc potential), the switching control voltage adjusting circuit 80 inverts polarity of the signal V5 by the inverter circuit 81. Since GND potential, which is a low polarity of the signal V5, is applied to the gate of the M7, the M7 is ON. At this point of time, Vcc potential at the Vcc terminal 9 is applied to the gate of the M6 through the source and the drain of the M7.

When the signal V5 is LOW (GND potential), the switching control voltage adjusting circuit 80 inverts the polarity of the signal V5 by the inverter circuit 81. Since Vcc potential, which is a high polarity of the signal V5, is applied to the gate of the M7, the M7 is OFF. At this point of time, the voltage VL decided by the following formula (1) is applied to the gate of the M6 through the switching control voltage adjusting circuit 80.

In addition, in the following formula (1), a resistance value of the second resistance 82 is defined as $R_2$, a resistance value of the third resistance 83 is defined as $R_3$, a resistance value of the fourth resistance 84 is defined as $R_4$, and an ON resistance of the M8 is defined as $R_{ONM8}$. Furthermore, each resistance value is preliminarily decided so that the voltage VL is lower than the threshold voltage Vths of the M6 and is close to the threshold voltage Vths of the M6.

$$VL=\{(R_{ONM8}\cdot(R_3+R_4)/(R_{ONM8}+R_3+R_4)/(R_{ONM8}\cdot(R_3+R_4)/((R_{ONM8}+R_3+R_4)+R_2))\}\cdot(R_3/(R_3+R_4)) \qquad (1)$$

FIG. 3 is a timing diagram showing operations of the step-down voltage output circuit using a charge pump circuit in accordance with Embodiment 2 of the present invention at around activation of the power-supply voltage Vcc (when the step-down voltage output Vsub is changed from OFF state to ON state (from GND potential to −Vcc potential)). In FIG. 3, at an initial condition, the power-supply voltage Vcc is zero, the control signal Vctl, the clock signal V1, and the signal V5 are LOW, and the step-down voltage output Vsub is in GND potential.

First of all, the power-supply voltage Vcc is applied to the Vcc terminal 9 (at the point of time P1). At this point of time, the oscillating circuit 1 and the timer circuit 11 have stopped each operation since the control signal Vctl is LOW (GND potential).

Next, in the state that the power-supply voltage Vcc is applied to the Vcc terminal 9, the control signal Vctl is changed from LOW (GND potential) to HIGH (Vcc potential) (at the point of time P2). The oscillating circuit 1 starts self-oscillation at the predetermined frequency. The timer circuit 11 starts the timer operation. During the period between the time when the control signal Vctl becomes HIGH and the time when the timer period T4 expires, the signal V5 is kept to LOW (GND potential) by the timer circuit 11. At this point of time, since Vcc potential, which is the high polarity of the signal V5, is applied to the gate of the M7 by the inverter circuit 81, the M7 is OFF. The voltage VL is applied to the gate of the M6, and GND potential at the Vsub terminal 10 is applied to the source thereof. The M6 is OFF since the voltage VL is set to be lower than the threshold voltage Vths of the M6. The M5 is ON since Vcc potential is applied to the gate of the M5 through the first resistance 8 and GND potential at the Vsub terminal 10 is applied to the source thereof. The Vsub terminal 10 is short-circuited to GND with low impedance through the source and the drain of the M5, and then GND potential is output from the Vsub terminal 10. During passage of the predetermined timer period T4, the oscillating circuit 1 comes to oscillate at the predetermined amplitude, and then the charge pump circuit gets into the state that it can operate with stability.

After the predetermined timer period T4, the timer circuit 11 outputs the HIGH (Vcc potential) signal V5 (at the point of time P3). The M7 turns ON since GND potential, which is the low polarity of the signal V5, is applied to the gate of the M7. The M6 turns ON since Vcc potential is applied to the gate of the M6 through the source and the drain of the M7 and GND potential at the Vsub terminal 10 is applied to the source thereof. The M5 turns OFF since GND potential at the Vsub terminal 10 is applied to the gate of the M5 through the source and the drain of the M6 and GND potential at the Vsub terminal 10 is applied to the source thereof. The voltage −Vcc charged in the capacitor 7 is output from the Vsub terminal 13 (at the point of time P4).

FIG. 6 is a timing diagram showing the operations of the step-down voltage output circuit using a charge pump circuit in accordance with Embodiment 2 of the present invention when the step-down voltage output Vsub is changed from ON state to OFF state (from −Vcc potential to GND potential).

First of all, the control signal Vctl is changed from HIGH (Vcc potential) to LOW (GND potential) (at the point of time P10). Simultaneously, the oscillating circuit 1 and the timer circuit 11 stop each operation, and as a result, the clock signal V1 and the signal V5 become LOW (GND potential) (at the point of time P11 and P12).

At this point of time, since Vcc potential, which is the high polarity of the signal V5, is applied to the gate of the M7, the M7 is OFF. The voltage VL is applied to the gate of the M6, and −Vcc potential at the Vsub terminal 10 is applied to the source thereof. However, since the potential difference between the gate and the source of the M6 is larger than the threshold voltage Vths of the M6, the M6 is still kept in ON state. Therefore, the M5 is still kept in OFF state.

The operation timings for outputting −Vcc to the Vsub terminal 10 by the oscillating circuit 1 and the timer circuit 11, each operation timing whereof is formed as one cycle of T3→T1→T3→T2→T3, have stopped. Therefore, the voltage charged in the capacitor 7 is discharged by the internal resistance in the load circuit connected to the Vsub terminal 10, and as a result, the step-down voltage output Vsub starts to increase gradually from −Vcc level to GND level.

When the voltage difference between the voltage at the source of the M6 and the VL potential that is applied to the gate thereof comes equal to or smaller than the threshold voltage Vths of the M6 eventually (i.e. (VL−Vsub)≦Vths), the M6 turns OFF and the M5 turns ON. Thereby, the Vsub terminal 10 is short-circuited to GND with low impedance again, and then GND potential is output from the Vsub terminal 10 (at the point of time P63).

The voltage VL can be adjusted arbitrarily by varying the resistance value R$_2$ of the second resistance 82, the resistance value R$_3$ of the third resistance 83, the resistance value R$_4$ of the fourth resistance 84, and the ON resistance R$_{ONM8}$ of the M8. Therefore, by setting the voltage VL to the value that is lower than the threshold voltage Vths of the M6 and is close to the threshold voltage Vths, the amount of the change of the substrate potential when the step-down voltage output Vsub is changed from ON state to OFF state (from −Vcc potential to GND potential) can be further reduced.

As described above, in the step-down voltage output circuits using a charge pump circuit in accordance with Embodiment 2 of the present invention, the step-down voltage output Vsub increases gradually from −Vcc potential to GND potential resulting from the discharge by the internal resistance in the load circuit connected to the Vsub terminal 10 when the step-down voltage output Vsub is changed from OFF state to ON state (from −Vcc potential to GND potential). Thereby, in the case that a semiconductor device incorporates therein such a step-down voltage output circuit and supplies the substrate potential from the Vsub terminal 10, rapid change of the voltage to be supplied to the load circuit connected to the Vsub terminal 10 can be prevented.

According to the step-down voltage output circuit in accordance with Embodiment 2 of the present invention, by adjusting the low-polarity control voltage that is to be applied to the gate of the M6 to the voltage that is close to the threshold voltage of the M6 when the step-down voltage output is changed from ON state to OFF state (from −Vcc potential to GND potential), the amount of the change of the substrate potential can be further reduced.

In addition, the configuration shown in FIG. 7 was taken to explain the switching control voltage adjusting circuit 80 in Embodiment 2. However, the switching control voltage adjusting circuit 80 is not limited to this configuration. Any other configuration in which the low-polarity control voltage that is to be applied to the gate of the M6 is adjusted to the predetermined voltage may be applied. In that case, the similar effect as in Embodiment 2 can be obtained.

The present invention has industrial applicability, for example, for use in a semiconductor integrated circuit.

Although the present invention has been described with respect to its preferred embodiments in some detail, the disclosed contents of the preferred embodiments may change in the details of the structure thereof, and any changes in the combination and sequence of the component may be attained without departing from the scope and spirit of the claimed invention.

The invention claimed is:

1. A step-down voltage output circuit having a charge pump circuit with an oscillating circuit for stepping down a power-supply voltage and outputting a step-down voltage, the step-down voltage output circuit comprising:
   a timer circuit in which a timer period is set depending on a frequency of said oscillating circuit, said timer circuit outputting LOW from a time when a control signal having a first level is input thereto to a time when said timer period expires and outputting HIGH after said timer period expires during a period in which said control signal having the first level is input from a control signal input terminal, and outputting LOW during a period in which a control signal having a second level which is different from the first level is input from said control signal input terminal;
   a first N-channel MOS transistor in which a source is connected to a step-down voltage output terminal, a drain is connected to a ground potential, and a gate is connected to a power-supply voltage input terminal through a resistance; and
   a second N-channel MOS transistor in which a source is connected to said step-down voltage output terminal, a drain is connected to the gate of said first N-channel MOS transistor, and a gate is connected to an output terminal of said timer circuit.

2. The step-down voltage output circuit, as claimed in claim 1, further comprising
   a control voltage adjusting part that adjusts an output of said timer circuit and outputs a predetermined voltage that is lower than a threshold voltage of said second N-channel MOS transistor and is close to said threshold voltage during a period wherein the output of said timer circuit is LOW.

3. A step-down voltage output circuit comprising:
   a timer circuit that operates depending on a control signal which is input thereto and on a predetermined timer period;
   a first N-channel MOS transistor in which a source is directly connected to a step-down voltage output terminal, a drain is directly connected to a ground potential, and a gate is connected to a power-supply voltage input terminal through a resistance; and
   a second N-channel MOS transistor in which a source is connected to said step-down voltage output terminal, a drain is connected to the gate of said first N-channel MOS transistor, and a gate is connected to an output terminal of said timer circuit.

* * * * *